United States Patent
Villa (10) Patent No.: US 10,593,215 B2
(45) Date of Patent: Mar. 17, 2020

(54) DYNAMIC AIRCRAFT ROUTING

(71) Applicant: Uber Technologies, Inc., San Francisco, CA (US)

(72) Inventor: Ian Villa, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 0 days.

(21) Appl. No.: 16/169,726

(22) Filed: Oct. 24, 2018

(65) Prior Publication Data

US 2019/0340937 A1 Nov. 7, 2019

Related U.S. Application Data (60) Provisional application No. 62/668,745, filed on May 8, 2018, provisional application No. 62/668,176, filed on May 7, 2018.

(51) Int. Cl.
| | | |
|---|---|---|
| G08G 5/00 | (2006.01) | |
| G01C 21/20 | (2006.01) | |
| B64C 29/00 | (2006.01) | |

(52) U.S. Cl.
CPC ........... G08G 5/0034 (2013.01); G01C 21/20 (2013.01); G08G 5/0013 (2013.01); G08G 5/0043 (2013.01); B64C 29/0025 (2013.01)

(58) Field of Classification Search
CPC .................................................. G08G 5/0034
See application file for complete search history.

(56) References Cited

U.S. PATENT DOCUMENTS

| | | | | |
|---|---|---|---|---|
| 9,776,715 B2* | 10/2017 | Zhou | ................... | B64C 29/0075 |
| 9,828,107 B1* | 11/2017 | Ruymgaart | ............ | B64D 31/06 |
| 2009/0164260 A1 | 6/2009 | Kane | | |
| 2010/0172510 A1* | 7/2010 | Juvonen | ............... | G10K 11/178 |
| | | | | 381/71.6 |
| 2011/0056183 A1* | 3/2011 | Sankrithi | ................ | B64C 11/48 |
| | | | | 60/204 |
| 2012/0237049 A1* | 9/2012 | Brown | ................. | G10K 11/178 |
| | | | | 381/71.1 |
| 2015/0379874 A1* | 12/2015 | Ubhi | ..................... | G01S 5/0027 |
| | | | | 701/3 |

(Continued)

OTHER PUBLICATIONS

U.S. Appl. No. 16/405,493, filed May 7, 2019, Dynamic Aircraft Routing.

(Continued)

*Primary Examiner* — Alex C Dunn
(74) *Attorney, Agent, or Firm* — Schwegman Lundberg & Woessner, P.A.

(57) ABSTRACT

A request for transport services that identifies a rider, an origin, and a destination is received from a client device. Eligibility of the request to be serviced by a vertical take-off and landing (VTOL) aircraft is determined based on the origin and the destination. A transportation system determines a first and a second hub for a leg of the transport request serviced by the VTOL aircraft and calculates a set of candidate routes from the first hub to the second hub. A provisioned route is selected from among the set of candidate routes based on network and environmental parameters and objectives including pre-determined acceptable noise levels, weather, and the presence and planned routes of other VTOL aircrafts along each of the candidate routes.

21 Claims, 5 Drawing Sheets

(56) References Cited

U.S. PATENT DOCUMENTS

| | | | | |
|---|---|---|---|---|
| 2016/0368600 A1* | 12/2016 | Frolov | ................ | G08G 5/0021 |
| 2017/0197710 A1* | 7/2017 | Ma | ...................... | G05D 1/0676 |
| 2017/0274983 A1* | 9/2017 | Beckman | ............... | B64C 11/48 |
| 2018/0029431 A1* | 2/2018 | Tang | ...................... | B60B 19/00 |
| 2018/0308366 A1* | 10/2018 | Goel | ..................... | G08G 5/003 |
| 2018/0331940 A1* | 11/2018 | Jadhav | ................. | H04L 45/121 |
| 2019/0023385 A1* | 1/2019 | Nguyen | ................. | B64C 27/26 |
| 2019/0033084 A1* | 1/2019 | Chen | ................ | G01C 21/3415 |

OTHER PUBLICATIONS

U.S. Appl. No. 16/437,745, filed Jun. 11, 2019, Dynamic Aircraft Routing.

"International Application Serial No. PCT US2019 031124, International Search Report dated Jul. 19, 2019", 5 pgs.

"International Application Serial No. PCT US2019 031124, Written Opinion dated Jul. 19, 2019", 7 pgs.

Bart, De Jong, "Optimizing cost effectiveness and flexibility of air taxis", Haarlem, (Sep. 30, 2007).

F M Van, Der Zwan, "Development of an Aircraft Routing System for an Air Taxi Operator", (Sep. 12, 2016).

Jon, Peterson, "Fast Forwarding to a World of On-Demand Air Transportation", Smart Urban Transportation Forum, (May 15, 2017).

* cited by examiner

DYNAMIC AIRCRAFT ROUTING

CROSS REFERENCE TO RELATED APPLICATIONS

This application claims the benefit of U.S. Provisional Application No. 62/668,176, filed May 7, 2018 and U.S. Provisional Application 62/668,745 filed May 8, 2018, which are incorporated by reference in their entirety.

TECHNICAL FIELD

The subject matter described herein generally relates to aviation transport networks, and in particular to dynamic aircraft routing based on noise, weather, and network data.

BACKGROUND

There is generally a wide variety of modes of transport available within cities. People may walk, ride a bike, drive a car, take public transit, use a ride sharing service, and the like. However, as population densities and demand for land increase, many cities are increasingly experiencing problems with traffic congestion and the associated pollution. Consequently, there is a need to expand the available modes of transport in ways that may reduce the amount of traffic without requiring the use of large amounts of land.

SUMMARY

Aspects and advantages of embodiments of the present disclosure will be set forth in part in the following description, or can be learned from the description, or can be learned through practice of the embodiments.

Example aspects of the present disclosure are directed to various systems, apparatuses, non-transitory computer-readable media, user interfaces, and electronic devices. For instance, a transport network coordination system determines a provisioned route for transport services by a VTOL aircraft from a first hub to a second hub and provides routing information to the VTOL aircraft responsive to determining the provisioned route. Network and environmental parameters such as the number of VTOL aircraft that will be at the origin hub within a specified time period, the number of VTOL aircraft that have a planned route between the origin hub and the destination hub, and pre-determined acceptable noise levels in the vicinity of the hubs may be used to generate candidate routes for the VTOL aircraft. Candidate route may optimize for a different parameter or combination of parameters, for example, avoiding routes through areas in which the pre-determined acceptable noise level is low or routes that pass within a threshold distance of planned routes for a number of other VTOL aircraft. The system calculates a noise profile for each candidate route and may select a candidate route that has the earliest estimated time of arrival at the destination hub and that does not exceed a threshold noise level at any point along the route. In other embodiments, different network and/or environmental parameters may be used to select the preferred route.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

DETAILED DESCRIPTION

The Figures and the following description describe certain embodiments by way of illustration only. One skilled in the art will readily recognize from the following description that alternative embodiments of the structures and methods illustrated herein may be employed without departing from the principles described herein. Reference will now be made to several embodiments, examples of which are illustrated in the accompanying figures. It is noted that wherever practicable similar or like reference numbers may be used in the figures and may indicate similar or like functionality.

Air travel within cities has been limited compared to ground travel. Air travel can have a number of requirements making intra-city air travel difficult. For instance, aircraft can require significant resources such as fuel and infrastructure (e.g., runways), produce significant noise, and require significant time for boarding and alighting, each presenting technical challenges for achieving larger volume of air travel within cities or between neighboring cities. However, providing such air travel may reduce travel time over purely ground-based approaches as well as alleviate problems associated with traffic congestion.

Vertical take-off and landing (VTOL) aircraft provide opportunities to incorporate aerial transportation into transport networks for cities and metropolitan areas. VTOL aircraft require much less space to take-off and land relative to traditional aircraft. In addition, developments in battery technology have made electric VTOL aircraft technically and commercially viable. Electric VTOL aircraft may be quieter than aircraft using other power sources, which further increases their viability for use in built-up areas where noise may be a concern.

Example Vertical Take-Off and Landing Aircraft

Figure 1:
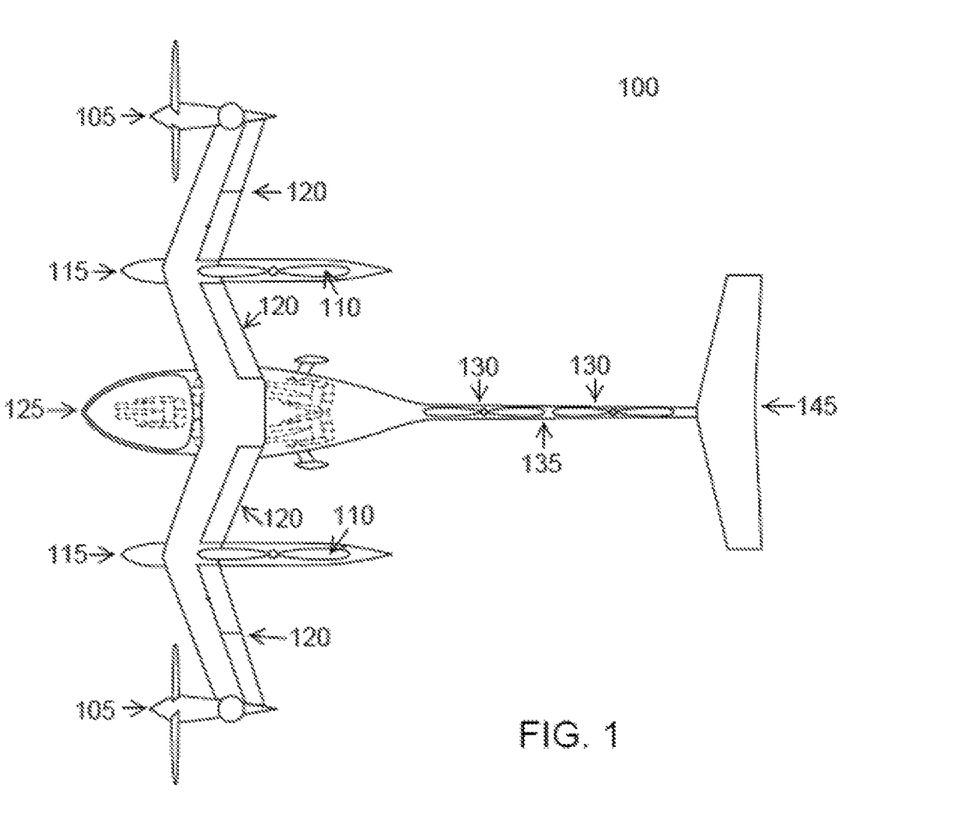
FIG. 1 illustrates an electric VTOL aircraft, in accordance with an embodiment.

Turning now to the specifics of the vehicle, FIG. 1 illustrates one embodiment of an electric VTOL aircraft 100. In the embodiment shown in FIG. 1, the VTOL aircraft 100 is a battery-powered aircraft that transitions from a vertical take-off and landing state with stacked lift propellers to a cruise state on fixed wings.

The VTOL aircraft 100 has an M-wing configuration such that the leading edge of each wing is located at an approximate midpoint of the wing. The wingspan of a VTOL aircraft 100 includes a cruise propeller 105 at the end of each wing, a stacked wing propeller 110 attached to each wing boom 115 behind the middle of the wing, and wing control surfaces 120 spanning the trailing edge of each wing. At the center of the wingspan is a fuselage 125 with a passenger compartment that may be used to transport passengers and/or cargo. The VTOL aircraft 100 further includes two stacked tail propellers 130 attached to the fuselage tail boom 135 and a hinged control surface 140 (not shown) spanning the bottom length of the tail boom 135. A lifting T-tail 145 provides stability to the VTOL aircraft 100.

During vertical assent of the VTOL aircraft 100, the rotating cruise propellers 105 on the nacelles are pitched upward at a 90-degree angle and the stacked propellers 110 and 130 are deployed from the wing booms 115 and the tail boom 135 to provide lift. The wing control surfaces 120 are pitched downward and the tail control surface 140 tilts to control rotation about the vertical axis during takeoff. As the VTOL aircraft 100 transitions to a cruise configuration, the nacelles rotate downward to a zero-degree position such that the cruise propellers 105 are able to provide forward thrust. Control surfaces 120 and 140 return to a neutral position with the wings and tail boom 135, and the stacked lift propellers 110 and 130 stop rotating and retract into cavities in the wing booms 115 and tail boom 135 to reduce drag during forward flight.

During transition to a descent configuration, the stacked propellers 110 and 130 are redeployed from the wing booms 115 and tail boom 135 and begin to rotate along the wings and tail to generate the lift required for descent. The nacelles rotate back upward to a 90-degree position and provide both thrust and lift during the transition. The wing control surfaces 120 on are pitched downward to avoid the propeller wake, and the tail boom control surfaces 140 tilt for yaw control.

Example System Environment

Figure 2:
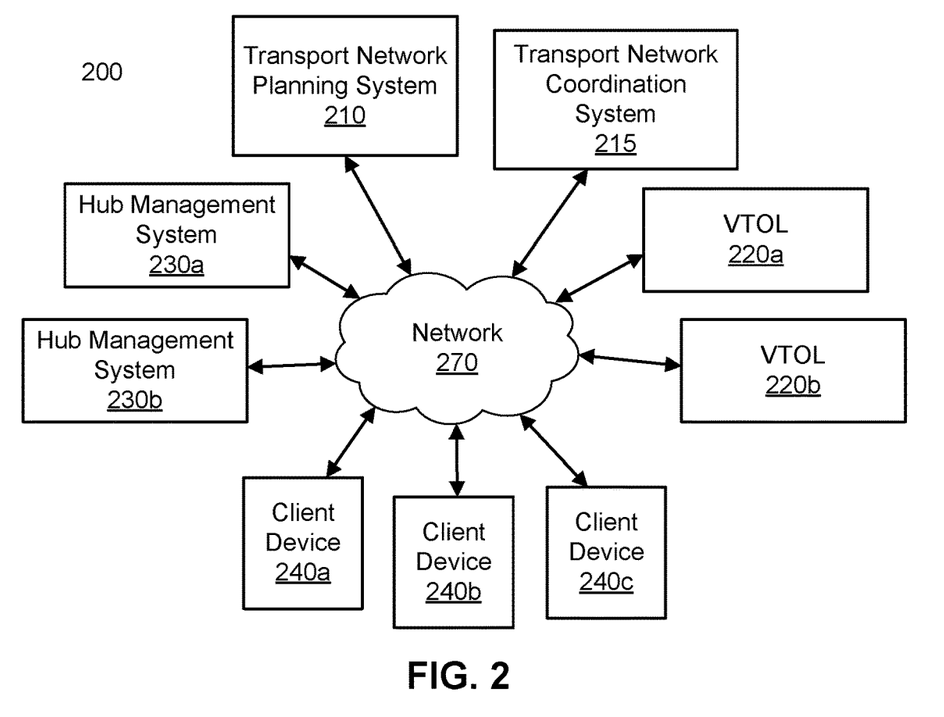
FIG. 2 is a high-level block diagram illustrating a computing environment associated with a transport network, in accordance with an embodiment.

FIG. 2 illustrates one embodiment of a computing environment 200 associated with an aviation transport network. In the embodiment shown in FIG. 2, the computing environment 200 includes a transport network planning system 210, a transport network coordination system 215, a set of VTOL aircraft 220a, 220b, a set of hub management systems 230a, 230b, and a set of client devices 240a, 240b, all connected via a network 270.

When multiple instances of a type of entity are depicted and distinguished by a letter after the corresponding reference numeral, such entities shall be referred to herein by the reference numeral alone unless a distinction between two different entities of the same type is being drawn. In other embodiments, the computing environment 200 contains different and/or additional elements. In addition, the functions may be distributed among the elements in a different manner than described. For example, the hub management systems 230 may be omitted with information about the hubs stored and updated at the transport network planning system 210.

The transport network planning system 210 assists in the planning and design of the transport network. In one embodiment, the transport network planning system 110 estimates demand for transport services, suggests locations for VTOL hubs to meet that demand, and simulates the flow of riders and VTOL aircraft between hubs to assist in network planning. In one embodiment, suggested locations for VTOL hubs may be based in part on environmental factors such as the type of area (e.g., commercial or residential), pre-determined acceptable noise levels in the area, historical weather patterns in the area, and/or other nearby transportation hubs (e.g., existing VTOL hubs, airports, train stations, etc.). The transport network planning system 210 obtains environmental data from publicly available data sources and stores the data in a map data store 325 for use by the transport network coordination system 215. The transport network planning system 210 further stores the locations of VTOL hubs in a hub data store (not shown).

The transport network coordination system 215 determines a route for transport services by a VTOL aircraft 220 from a first hub to a second hub and provides routing information to the VTOL aircraft 220, including what time to leave a first hub, which hub to fly to after departure, way points along the route, how long to spend charging before departure from the first hub or upon arrival at the second hub, and the identity of individuals to carry. The network coordination system 215 can determine the route based at least partly on an optimization process. The transport network coordination system 215 may also direct certain VTOL aircraft 220 to fly between hubs without riders to improve fleet distribution (referred to as "deadheading"). Various embodiments of the transport network coordination system 215 are described in greater detail below, with reference to FIG. 3.

The transport network coordination system 215 is further configured as a communicative interface between the various entities of the computing environment 200 and is one means for performing this function. The transport network coordination system 215 is configured to receive sets of service data representing requests for transportation services from the client devices 240 and creates corresponding service records in a transportation data store (not shown). According to an example, a service record corresponding to a set of service data can include or be associated with a service ID, a user ID, an origin hub, a destination hub, a service type, pricing information and/or a status indicating that the corresponding service data has not been processed. In one embodiment, when the transport network coordination system 215 selects a VTOL aircraft 220 to provide the transportation service to the user, the service record can be updated with information about the VTOL aircraft 220 as well as the time the request for service was assigned.

The VTOL aircraft 220 are vehicles that fly between hubs in the transport network. A VTOL aircraft 220 may be controlled by a human pilot (inside the vehicle or on the ground) or it may be autonomous. In one embodiment, the VTOL aircraft 220 are battery-powered aircraft that use a set of propellers for horizontal and vertical thrust, such as the VTOL aircraft shown in FIG. 1. The configuration of the propellers enables the VTOL aircraft 220 to take-off and land vertically (or substantially vertically). For convenience, the various components of the computing environment 200 will be described with reference to this embodiment. However, other types of aircraft may be used, such as helicopters, planes that take-off at angles other than vertical, and the like. The term VTOL should be construed to include such vehicles.

A VTOL aircraft 220 may include a computer system that communicates status information (e.g., via the network 270) to other elements of the computing environment 200. The status information may include current location, planned route, current battery charge, potential component failures, and the like. The computer system of the VTOL aircraft 220 may also receive information, such as routing and weather information and information regarding the current location and planned routes of VTOL aircraft 220 in the vicinity of the VTOL aircraft 220. Further, in some embodiments, the computer system of the VTOL aircraft 220 collects noise and weather data (e.g., data collected from other vehicles) and transmits the data to the transport network coordination system 215. Although two VTOL aircraft 220 are shown in FIG. 2, a transport network can include any number of VTOL aircraft 220.

Hub management systems 230 provide functionality at hubs in the transport network. A hub is a location at which VTOL aircraft 220 are intended to take off and land. Within a transport network, there may be different types of hub. For example, a hub in a central location with a large amount of rider throughput might include sufficient infrastructure for sixteen (or more) VTOL aircraft 220 to simultaneously (or almost simultaneously) take off or land. Similarly, such a hub might include multiple charging stations for recharging battery-powered VTOL aircraft 220. In contrast, a hub located in a sparsely populated suburb might include infrastructure for a single VTOL aircraft 220 and have no charging station. The hub management system 230 may be located at the hub or remotely and be connected via the network 270. In the latter case, a single hub management system 130 may serve multiple hubs.

In one embodiment, a hub management system 230 monitors the status of equipment at the hub and reports to the transport network planning system 210. For example, if there is a fault in a charging station, the hub management system 230 may automatically report that it is unavailable for charging VTOL aircraft 220 and request maintenance or a replacement. The hub management system 230 may also control equipment at the hub. For example, in one embodiment, a hub includes one or more launch pads that may move from a takeoff/landing position to embarking/disembarking position. The hub management system 230 may control the movement of the launch pad (e.g., in response to instructions received from transport network coordination system 215 and/or a VTOL aircraft 220).

The client devices 240 are computing devices with which users may arrange transport services within the transport network. Although three client devices 240 are shown in FIG. 2, in practice, there may be many more (e.g., thousands or millions of) client devices connected to the network 270. In one embodiment, the client devices 240 are mobile devices (e.g., smartphones, tablets, etc.) running an application for arranging transport services. A user provides a pickup location and destination within the application and the client device 240 sends a request for transport services to the transport services coordination system 215. Alternatively, the user may provide a destination and the pickup location is determined based on the user's current location (e.g., as determined from GPS data for the client device 240).

The network 270 provides the communication channels via which the other elements of the networked computing environment 200 communicate. The network 270 can include any combination of local area and/or wide area networks, using both wired and/or wireless communication systems. In one embodiment, the network 270 uses standard communications technologies and/or protocols. For example, the network 270 can include communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via the network 270 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 270 may be represented using any suitable format, such as hypertext markup language (HTML) or extensible markup language (XML). In some embodiments, all or some of the communication links of the network 270 may be encrypted using any suitable technique or techniques.

Transport Network Coordination

Figure 3:
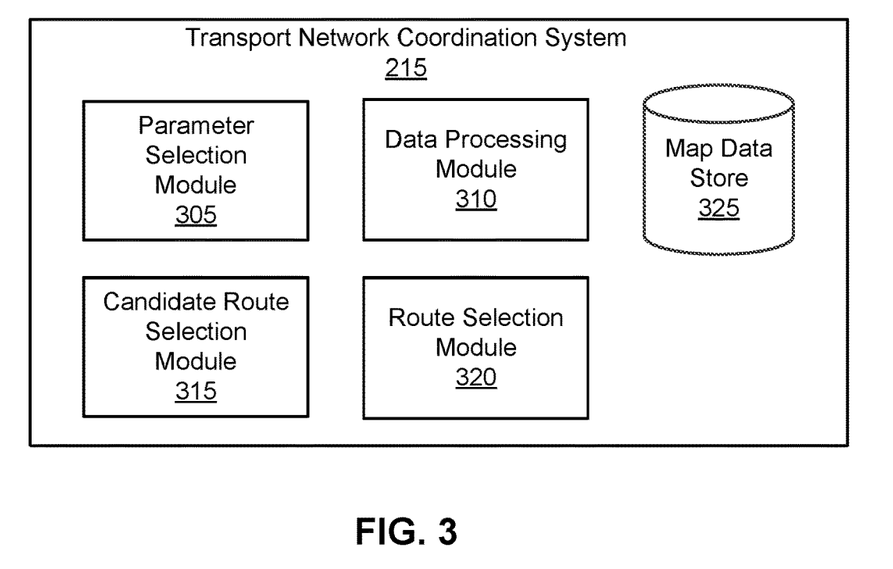
FIG. 3 is a high-level block diagram illustrating the transport network coordination system shown in FIG. 2, in accordance with an embodiment.

FIG. 3 illustrates one embodiment of the transport network coordination system 215. The transport network coordination system 215 determines a provisioned route for transport services by the VTOL aircraft 220 from a first hub to a second hub based on noise and weather data and data regarding the current locations and planned routes of other VTOL aircraft 220 within a threshold distance of the VTOL aircraft 220.

In the embodiment shown in FIG. 3, the transport network coordination system 215 includes a parameter selection module 305, a data processing module 310, a candidate route selection module 315, and a route selection module 320. In other embodiments, the transport network coordination system 215 includes different and/or additional elements. In addition, the functions may be distributed among the elements in a different manner than described.

The parameter selection module 305 provides a user interface for defining various parameters to be used in the optimization of VTOL route selection. In one embodiment, the definable parameters include network and environmental parameters and objectives. Network and environmental parameters may include a number of VTOL aircraft 220 that will be at the first hub within a specified time period, a number of VTOL aircraft 220 with a planned route between the first hub or the second hub, the presence and locations of VTOL hubs between the first hub and the second hub and the number and schedule of VTOL aircraft 220 intended to take-off or land at the VTOL hubs, environmental noise between the first hub and the second hub, the presence and location of other transportation hubs, current and predicted weather between the first hub and the second hub, and pre-determined acceptable noise levels between the first hub and the second hub.

The network and environmental objectives may be to (1) avoid routes through areas in which the pre-determined acceptable noise level is low (e.g., residential neighborhoods), (2) avoid areas of high environmental noise (e.g., train stations), (3) avoid routes that pass within a threshold distance of other transportation hubs (e.g., airports), (4) avoid routes where the current and/or predicted weather is unfavorable (e.g., high wind gusts or forces), (5) avoid routes that pass within a threshold distance of one or more VTOL hubs, (6) avoid routes that pass within a threshold distance of planned routes for a given number of other VTOL aircraft 220, (7) minimize predicted travel time, (8) minimize total distance traveled, and the like.

The data processing module 310 accesses network and environmental data needed to calculate candidate routes for VTOL travel based on one or more selected parameters and/or objectives. In one embodiment, the data processing module 310 queries the transport network planning system 210 to obtain data regarding the locations of VTOL hubs as well as the environmental data in the vicinity of the first hub and the second hub. In one embodiment, the data processing module 310 tracks localized weather and noise data and differentiates contributions from various actors (e.g., determines the type of cloud producing rain, determines whether a detected noise is due to birds or other VTOL aircraft, etc.).

The data processing module 310 further queries the map data store 325 to obtain data regarding the presence, location, and planned routes of VTOL aircraft between the first hub and the second hub. The transport network planning system 210 and the map data store 325 return the requested information to the data processing module 310, which sends the information to the candidate route selection module 315 along with the selected objectives for the route.

The candidate route selection module 315 identifies candidate routes for VTOL aircraft travel between a first hub and a second hub. In one embodiment, to determine the candidate routes, the candidate route selection module 315 computes different routes between the first hub and the second hub that each optimizes for a different parameter or combination of parameters associated with the network and environmental parameters and objectives. Each optimization function is associated with a set of optimized parameters and assigns weights to the optimized parameters such that the routing options generated by the function optimizes for parameters having higher weights relative to parameters having lower weights. For example, an optimization function may assign a higher weight to the network traffic along a candidate route relative to the total distance traveled, and therefore, the generated routing option may avoid areas in which other VTOL hubs are located, but travel a larger distance. In other embodiments, the candidate routes between the first and second hubs are determined in other ways. For example, a network planner may manually select a set of routes between the pair of hubs (e.g., by tracing them on a map, selecting a series of waypoints, or the like). Regardless of how the candidate routes are determined, in one example embodiment, the candidate route selection module 315 stores (e.g., in a database) a set of candidate routes between each pair of hubs in the transport network. The candidate routes from a first hub to a second hub may be the same of different from the candidate routes from the second hub to the first hub.

The route selection module 320 selects the routes for specific VTOL aircraft 220 traveling from a first hub to a second hub. In one embodiment, the route selection module 320 retrieves the candidate routes from the first hub to the second hub from the candidate route selection module 315 and selects one of the candidates as the preferred route between the first hub and the second hub based on the selected network and environmental parameters and objectives. The route selection module 320 calculates a noise profile for each candidate route based on the noise generated by the VTOL aircraft 220 and other predicted noise sources along the candidate route (e.g., other VTOL aircraft 220, typical noise levels in the area at that time, etc.) as well as the pre-determined acceptable noise level in areas within a threshold distance of the candidate route. If the route selection module 320 determines that a noise profile exceeds a threshold level at any point along a candidate route, the route selection module 320 discards the candidate route as a possible option for the transport service. The route selection module 320 may select the candidate route that has the earliest estimated time of arrival at the second hub and that does not exceed the threshold noise level at any point along the route. Additionally or alternatively, different network and environmental parameters and objectives may be used to select the preferred route. For example, in one embodiment, the route selection module 320 calculates a route cost for each candidate route and selects the candidate route with the lowest route cost. The route cost may be a function of network and environmental factors such as the distance of the route, the anticipated amount of energy required to transport the VTOL aircraft 220 along the route, the cost to transport the VTOL aircraft 220 along the route, the anticipated noise level along the route, and anticipated observer annoyance.

The selected route is sent to the VTOL aircraft 220. In one embodiment, if the route selection module 320 determines that all of the candidate routes have noise profiles that exceed the threshold noise level, the route selection module 320 may notify the VTOL aircraft 220 that no acceptable routes currently exist for transport between the first hub and the second hub. The route selection module 320 may delay departure of the VTOL 220 and periodically (e.g., every five minutes) repeat the process until conditions have changed such that one of the candidate routes has a noise profile that does not exceed the noise threshold.

Exemplary Routing Configuration

Figure 4:
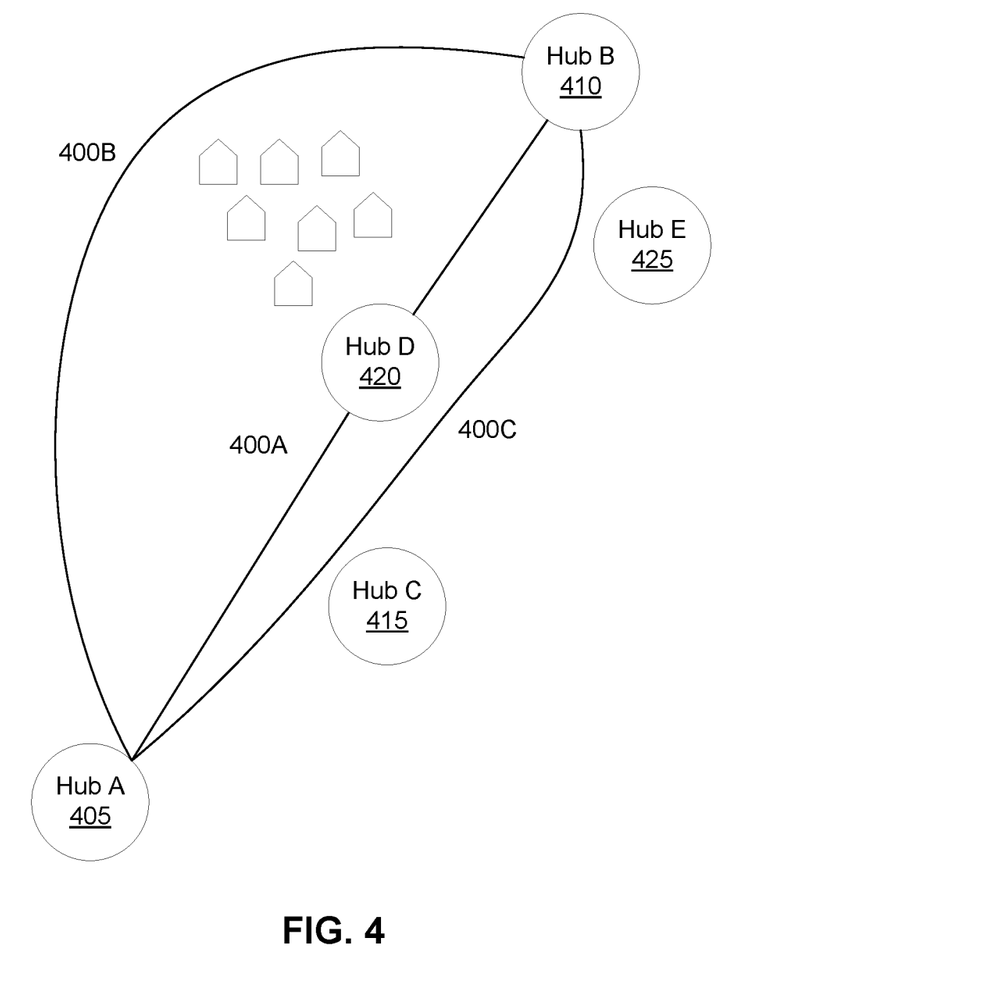
FIG. 4 illustrates candidate routes for optimal VTOL aircraft transport, in accordance with an embodiment.

FIG. 4 illustrates candidate routes for optimal VTOL aircraft transport, in accordance with an embodiment. In the embodiment shown in FIG. 4, the transport network coordination system 215 identifies candidate routes for transport between Hub A 405 and Hub B 410. Each candidate route 400A, 400B, and 400C is calculated based on network and environmental parameters and objectives, such as the presence and location of other VTOL hubs, current locations of other VTOL aircraft 220, planned routes of other VTOL aircraft 220, pre-determined acceptable noise levels and current and predicted weather between Hub A 405 and Hub B 410, and localized weather (e.g., sudden downbursts, localized hail, lightening, unsteady wind conditions, etc.) in the vicinity of the planned routes. Although three candidate routes are shown in FIG. 4, more or fewer candidate routes may be calculated in other embodiments.

Candidate route 400A represents a direct line of travel between Hub A 405 and Hub B 410 such that candidate route 400A is the shortest of the candidate routes in terms of distance traveled. However, as shown in FIG. 4, candidate route 400A passes over Hub D 420. In one embodiment, therefore, if other VTOL aircraft 220 are taking off and landing at Hub D 420, candidate route 400A might not be selected as the provisioned route for the transport to reduce air traffic congestion at and around Hub D.

As shown in FIG. 4, candidate route 400B would take the VTOL aircraft 220 around a residential area with low pre-determined acceptable noise levels to minimize the projection of noise into unwanted areas. However, candidate route 400B represents the longest total distance between Hub A 405 and Hub B 410 and might not be selected as the provisioned route for the VTOL aircraft 220 if other candidate routes that satisfy selected parameters and objectives and have a shorter total distance are available.

Finally, candidate route 400C is a shorter total distance than candidate route 400B and avoids the area of low pre-determined acceptable noise level. Further, while candidate route 400C passes near Hub C 415 and Hub E 425, the route does not pass directly over these other VTOL hubs. Therefore, if the selected network and environmental objectives include avoiding areas in which the pre-determined acceptable noise level is low, avoiding routes that pass within a threshold distance of one or more VTOL hubs, and/or minimizing the total distance traveled, the candidate route selection module 315 might select candidate route 400C as the preferred route between Hub A 405 and Hub B 410.

Exemplary Routing Method

Figure 5:
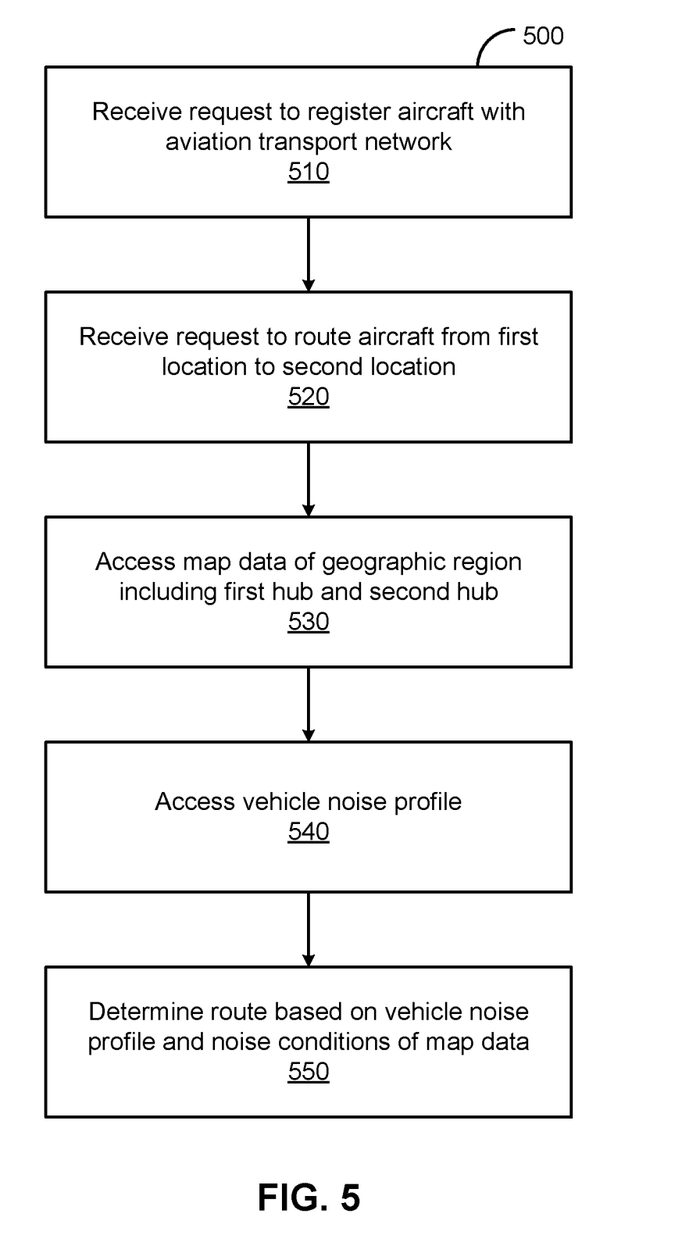
FIG. 5 is a flowchart illustrating a method for dynamic routing of a VTOL aircraft, in accordance with an embodiment.

FIG. 5 illustrates one embodiment of a method 500 for dynamic routing of a VTOL aircraft 220. The steps of FIG. 5 are illustrated from the perspective of the transport network coordination system 215 performing the method 500. However, some or all of the steps may be performed by other entities or components. In addition, some embodiments may perform the steps in parallel, perform the steps in different orders, or perform different steps.

In the embodiment shown in FIG. 5, the method 500 begins with the transport network coordination system 215 receiving 510 a request from a VTOL aircraft 220 to register the VTOL aircraft 220 with the aviation transport network. The transport network coordination system 215, which is a platform on which multiple carriers and multiple types of VTOL aircrafts can operate in an example embodiment, receives the registration request when, for example, a VTOL aircraft 220 goes online and is ready to provide services on the network. The request can include a unique vehicle identification (VID) and data indicative of the vehicle type and/or operator information. The transport network coordination system 215 can also receive, from the VTOL aircraft 220, vehicle state information including the charge level, the maintenance and/or health condition of the VTOL aircraft 220, and the distance to the next service or maintenance event. Additionally or alternatively, the transport network coordination system 215 can receive, from the VTOL aircraft 220, vehicle configuration data including seating capacity and configuration data.

At 520, the transport network coordination system 215 receives a request to route the VTOL aircraft 220 from a first location to a second location. In one embodiment, the routing request is generated in response to receiving a request from a user through a client device 240 for transportation from an origin location to a destination location. The transport network coordination system 215 may identify hubs corresponding to the first and second locations, which define an intermediary leg of the transport from the origin location to the destination location. For example, the transport might include a first leg in which the user is transported from an origin location to a first hub via a first ground-based vehicle or on foot, a second leg in which the user is transported from the first hub to a second hub via a VTOL aircraft 220, and a third leg in which the user is transported from the second hub to a destination location via a second ground-based vehicle or on foot. The transport network coordination system 215 can provide the determined first and second locations to the candidate route selection module 315 for computing candidate routes between the locations.

The data processing module 310 accesses 530 map data of a geographic region including the first hub and the second hub. Map data for a VTOL aircraft 220 may include data indicative of topology, buildings, flight envelope constraints, and acceptable noise levels or noise constraints. The map data may also be indicative of dynamic real-time information such as current weather in the area, localized weather, current noise levels, ambient noise level, air traffic, etc. Map data may also utilize previous weather, noise, and air traffic data for predictive purposes.

The data processing module 310 also accesses 540 vehicle noise profile data based on the vehicle data type of the VTOL aircraft 220. In one embodiment, the vehicle noise profile data includes a combination of precomputed estimates of noise using computational aeroacoustics of the VTOL aircraft 220 in various flight modes. Pressure data in the form of noise hemispheres is generated and propagated to different hypothetical observer locations. This data may also include data gathered from normal operation in different locales, times, and weather conditions. Such data can correspond to the vehicle type, the state of the health and maintenance of the VTOL aircraft 220, and gross weight. Computational analyses and real-time estimates may be verified and validated (both the pressure hemispheres and observed sound) for continued refinement of data and predictive capabilities. The noise profile data may be used to determine one or more estimates of noise levels along a candidate route. For example, for a given speed or engine power level, RPM, ambient moisture/temperature, and a given altitude, the noise profile may determine the estimated noise impact to the geographic area on the ground, surrounding buildings, hubs, and adjacent air vehicles. Additionally or alternatively, the noise profile may receive as input an operational noise level for the VTOL aircraft 220 (the level being selected based on meeting a maximum noise impact), and the noise profile can provide a performance level (including airspeed, altitude, passenger capacity, etc.) that can be used to optimize the routing.

At 550, the route selection module 320 determines a route for the VTOL aircraft 220 based on the vehicle noise profile and noise conditions of the map data. The route selection module 320 may determine a route cost for a number of predetermined candidate routes and select the candidate route with the lowest route cost. In one embodiment, route cost may be a function of distance, energy, cost, time, noise, observer annoyance, etc. Due to the temporal nature of the data utilized for optimization, the route selection module 320 may use Kalman filtering and/or predictive neural nets to filter and weight inputs and constraints to the VTOL routing algorithm. In one embodiment, candidate routes meet minimum acceptable or optimal criteria for flight. These paths may be visualized as convex hulls around the VTOL aircraft 220 itself and the interaction of this separation space with adjacent hulls (due to other vehicles, infrastructure, etc.) as a way to geometrically compute and visualize relevant or available routes. Optimization methods may be checked for continuity to ensure that generated routes meet realizable speed and maneuverability targets of operating vehicles. Relative vehicle information (e.g., position, velocity, state-of-charge, etc.) is also utilized to understand first-order effects of other aircraft within the vicinity of the VTOL aircraft 220.

Figure 6:
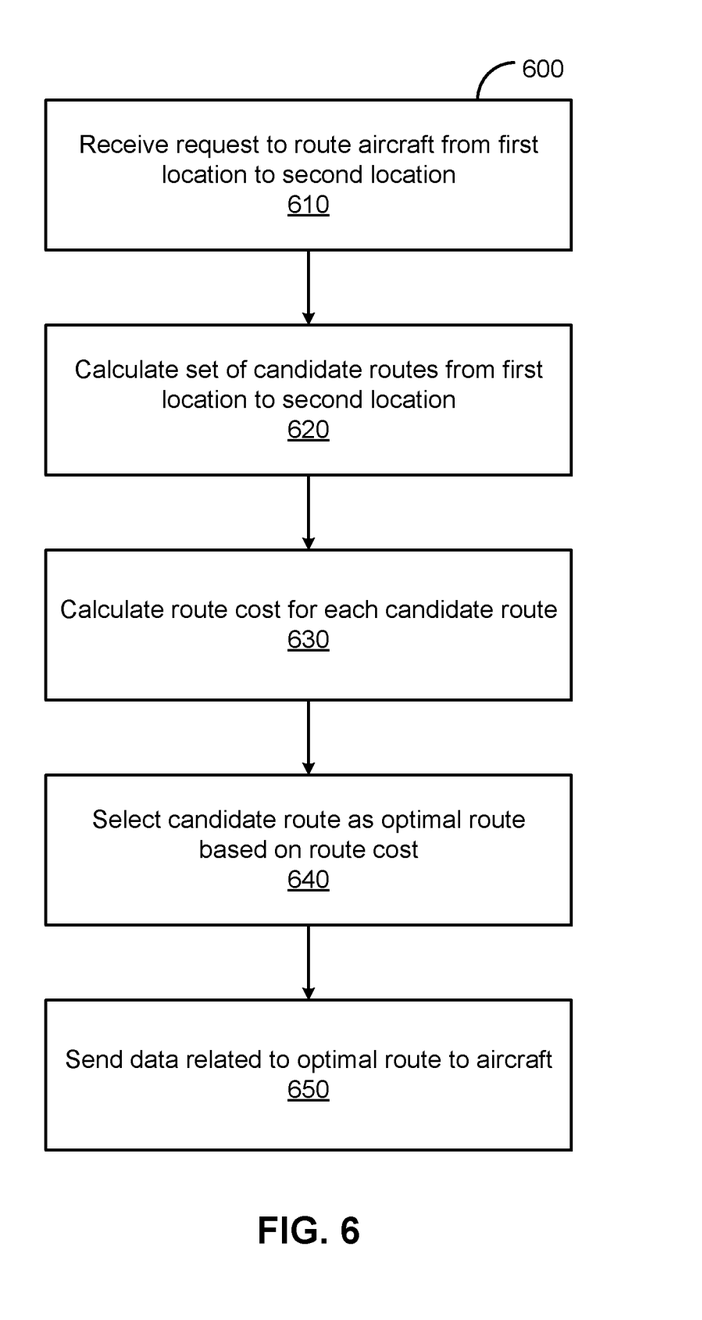
FIG. 6 is a flowchart illustrating a method for determining a route from a first VTOL aircraft hub to a second VTOL aircraft hub, in accordance with an embodiment.

FIG. 6 is illustrates one embodiment of a method 600 for determining a route from a first VTOL aircraft hub to a second VTOL aircraft hub. The steps of FIG. 6 are illustrated from the perspective of the transport network coordination system 215 performing the method 600. However, some or all of the steps may be performed by other entities or components. In addition, some embodiments may perform the steps in parallel, perform the steps in different orders, or perform different steps.

In the embodiment shown in FIG. 6, the method 600 begins with the transport network coordination system 215 receiving 610 a request to route a VTOL aircraft 220 from a first location to a second location. In one embodiment, the routing request is generated in response to receiving at least one request from a user through a client device 240 for transportation from an origin location to a destination location. The transportation from the origin location to the destination location may include a first leg during which a first ground-based vehicle transports the user from the origin location to the first location (i.e., a first VTOL hub), a second leg during which a VTOL aircraft 220 transports the user from the first location to a second location (i.e., a second VTOL hub), and a third leg during which a second ground-based vehicle transports the user from the second location to the destination location.

At 620, the candidate route selection module 315 calculates a set of candidate routes from the first location to the second location (i.e., for the second leg of the trip). In one embodiment, the candidate route selection module 315 computes different routes between the first location and the second location that each optimize for a different network or environmental parameters, such as pre-determined acceptable noise levels, the locations of other VTOL aircraft 220 and VTOL hubs, weather, predicted travel time, and the like. Alternatively, candidate routes may be manually selected (e.g., by selecting a series of waypoints between the first location and the second location).

For each candidate route in the set of candidate routes, the route selection module 320 calculates a route cost. In one embodiment, the route cost is a function of the network and/or environmental factors, such as the distance of the route, the anticipated amount of energy required to transport the VTOL aircraft 220 along the route, the cost to transport the VTOL aircraft 220 along the route, and the like. In some embodiments, the route selection module 320 selects a first candidate route with the lowest route cost and determines a noise profile for the route. If the route selection module 320 determines that the noise profile for the first candidate route is at or below an acceptable noise profile threshold, the route selection module 320 selects 640 the route as the provisioned route for the VTOL aircraft 220. Alternatively, if the route selection module 320 determines that the noise profile for the first candidate route exceeds the acceptable noise profile threshold, the route selection module 320 discards the first candidate route and calculates a noise profile for the candidate route with the second lowest noise profile. The route selection module 320 continues to calculate noise profiles for candidate routes until the route selection module 320 identifies a candidate route with a noise profile below the noise profile threshold. Responsive to selecting a candidate route as the provisioned route for the VTOL aircraft 220, the route selection module 320 sends data related to the provisioned route to the VTOL aircraft 220.

The description has been presented for the purpose of illustration; it is not intended to be exhaustive or to limit the scope of coverage to the precise forms disclosed. Persons skilled in the relevant art can appreciate that many modifications and variations are possible in light of the above disclosure.

Aspects of the disclosure, such as software for implementing the processes described herein, may be embodied in a non-transitory tangible computer readable storage medium or any type of media suitable for storing electronic instructions which may be coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of protection be limited not by this detailed description but rather by any claims that issue on an application based hereon. Accordingly, the disclosure of the embodiments described is intended to be illustrative but not limiting of the scope of the claims.

The invention claimed is:

1. A method for dynamically routing a VIOL aircraft in a transportation system, the method comprising:
    receiving, at the transportation system, a request to route the VTOL aircraft from a first location to a second location, the request generated in response to receiving a request for transport services from a client device associated with a user of the transportation system;
    in response to receiving the request to route the VIOL aircraft, determining a set of candidate routes from the first location to the second location;
    determining, by a processor of the transportation system, a route cost for each candidate route in the set of candidate routes, the route cost being a function of one or more network or environmental factors, the one or more network factors include a number of VIOL aircraft that will be at the first location within a specified time period;
    selecting a candidate route having a route cost at or below an acceptable route cost threshold as a provisioned route for the transport services; and
    transmitting data related to the provisioned route selected based on having the route cost at or below the acceptable route cost threshold to the VTOL, aircraft.

2. The method of claim 1, further comprising accessing map data of a geographic region including the first location and the second location, wherein the route costs are based on the map data.

3. The method of claim 1, wherein the request for transport services includes a request for transportation from an origin location to a destination location, the transport services including:
    a first leg from the origin location to the first location;
    a second leg from the first location to the second location, the second leg being serviced by the VIOL aircraft; and
    a third leg from the second location to the destination location.

4. The method of claim 1, wherein each candidate route in the set of candidate routes is optimized for an objective determined based on one or more of the network or environmental factors.

5. The method of claim 1, wherein the network factors include locations of one or more transportation hubs between the first location and the second location.

6. The method of claim 1, wherein the environmental factors include pre-determined acceptable noise levels of the environment between the first location and the second location.

7. The method of claim 1, wherein the environmental factors include current and predicted weather between the first location and the second location.

8. The method of claim 1, further comprising:
    determining that the route costs for each of the candidate routes exceeds an acceptable route cost threshold; and
    periodically recalculating the route costs for each of the candidate routes until at least one candidate route has a route cost at or below the acceptable route cost threshold.

9. The method of claim 1, wherein the route cost in based in part on vehicle noise profile data for the VTOL aircraft.

10. A method for dynamically routing a VTOL aircraft in a transportation, system, the method comprising:
    receiving, at the transportation system, a request to route the VTOL aircraft from a first location to a second location, the request generated in response to receiving a request for transport services from a client device associated with a user of the transportation system;
    in response to receiving the request to route the VTOL, aircraft, determining, by a processor of the transportation system, a set of candidate routes from the first location to the second location;
    selecting, from the set of candidate routes, a provisioned route for the transport services based on a noise profile of the candidate route, the selecting the provisioned route comprising:
        calculating a cost score for each candidate route in the set of candidate routes, the cost score being based on one or more network or environmental factors;
        selecting a first candidate route with a lowest cost score;

determining whether a noise profile for the first candidate route remains at or below an acceptable noise profile threshold for the first candidate route; and responsive to determining that the noise profile remains at or below the acceptable noise profile threshold, selecting the first candidate route as the provisioned route; and transmitting data related to the provisioned route to the VTOL aircraft.

11. The method of claim 10, wherein selecting the provisioned route comprises:

calculating a cost score for each candidate route in the set of candidate routes, wherein the cost score is based on one or more network or environmental factors;

selecting a first candidate route with a lowest cost score;

responsive to determining that a noise profile of the first candidate route exceeds an acceptable noise profile threshold at a point on the first candidate route, selecting a second candidate route with a next lowest cost score; and responsive to determining that a noise profile of the second candidate route remains at or below the acceptable noise profile threshold, selecting the second candidate route as the provisioned route.

12. The method of claim 10, wherein the request for transport services includes a request for transportation from an origin location to a destination location, the transport services including:

a first leg from the origin location to the first location;
a second leg from the first location to the second location, the second leg being serviced by the VTOL aircraft; and
a third leg from the second location to the destination location.

13. The method of claim 10, wherein the network factors include a number of VTOL aircrafts that will be at the first location within a specified time period.

14. The method of claim 10, wherein the environmental factors include current and predicted weather between the first location and the second location.

15. The method of claim 10, wherein the noise profile is based on noise profile data of the VTOL aircraft and other predicted noise sources along the provisioned route.

16. The method of claim 10, wherein the acceptable noise profile threshold is based on pre-determined acceptable noise levels in geographic areas within a threshold distance of the candidate route.

17. The method of claim 10, further comprising:
determining that the noise profile for each of the candidate routes exceeds an acceptable noise threshold; and
periodically recalculating the noise profile for each of the candidate routes until at least one candidate route has a noise profile at or below the acceptable noise threshold.

18. The method of claim 10, further comprising accessing map data of a geographic region including the first location and the second location, wherein the cost score is based on the map data.

19. A method for dynamically routing a VTOL aircraft in a transportation system, the method comprising:

receiving, at the transportation system, a request to route the VTOL aircraft from a first location to a second location, the request generated in response to receiving a request for transport services from a client device associated with a user of the transportation system;

in response to receiving the request to route the VTOL aircraft, determining a set of candidate routes from the first location to the second location;

determining, by a processor of the transportation system, a route cost for each candidate route in the set of candidate routes, the route cost being a function of one or more network or environmental factors;

determining that the route costs for each of the candidate routes exceeds an acceptable route cost threshold;

periodically recalculating the route costs for each of the candidate routes until at least one candidate route has a route cost at or below the acceptable route cost threshold;

selecting a candidate route having a route cost at or below an acceptable route cost threshold as a provisioned route for the transport services; and transmitting data related to the provisioned route selected based on having the route cost at or below the acceptable route cost threshold to the VTOL aircraft.

20. A method for dynamically routing a VTOL aircraft in a transportation, system, the method comprising:

receiving, at the transportation system, a request to route the VTOL aircraft from a first location to a second location, the request generated in response to receiving a request for transport services from a client device associated with a user of the transportation system;

in response to receiving the request to route the VTOL aircraft, determining, by a processor of the transportation system, a set of candidate routes from the first location to the second location;

selecting, from the set of candidate routes, a provisioned route for the transport services based on a noise profile of the candidate route, the selecting the provisioned route comprising:

calculating a cost score for each candidate route in the set of candidate routes, the cost score being based on one or more network or environmental factors;

selecting a first candidate route with a lowest cost score;

responsive to determining that a noise profile of the first candidate route exceeds an acceptable noise profile threshold at a point on the first candidate route; selecting a second candidate route with a next lowest cost score; and responsive to determining that a noise profile of the second candidate route remains at or below the acceptable noise profile threshold, selecting the second candidate route as the provisioned route; and transmitting data related to the provisioned route to the VTOL aircraft.

21. A method for dynamically routing a VTOL aircraft in a transportation, system, the method comprising:

receiving, at the transportation system, a request to route the VTOL aircraft from a first location to a second location, the request generated in response to receiving a request for transport services from a client device associated with a user of the transportation system;

in response to receiving the request to route the VTOL aircraft, determining, by a processor of the transportation system, a set of candidate routes from the first location to the second location;

determining that a noise profile for each of the candidate routes exceeds an acceptable noise threshold; and periodically recalculating the noise profile for each of the candidate routes until at least one candidate route has a noise profile at or below the acceptable noise threshold;

selecting, from the set of candidate routes, a provisioned route for the transport services based on the noise profile of the candidate route; and transmitting data related to the provisioned route to the VTOL aircraft.

\* \* \* \* \*

UNITED STATES PATENT AND TRADEMARK OFFICE
CERTIFICATE OF CORRECTION

PATENT NO. : 10,593,215 B2
APPLICATION NO. : 16/169726
DATED : March 17, 2020
INVENTOR(S) : Ian Villa

Page 1 of 1

It is certified that error appears in the above-identified patent and that said Letters Patent is hereby corrected as shown below:

On the Title Page

Item (72), in "Inventor", in Column 1, Line 1, after "(US)", insert --; Thomas Prevot, San Jose, CA, (US)--

Signed and Sealed this
Twenty-ninth Day of December, 2020

Andrei Iancu
*Director of the United States Patent and Trademark Office*